Patented Sept. 10, 1946

2,407,225

UNITED STATES PATENT OFFICE 2,407,225

THERMOSETTING MOLDING POWDER FROM WHEAT, WOOD PITCH, AND RESIN, AND METHOD OF MAKING

Cletus L. Dixon, Chicago, Ill., assignor, by mesne assignments, to The Protectoseal Company, Chicago, Ill., a corporation of Illinois No Drawing. Application January 8, 1943, Serial No. 471,760

19 Claims. (Cl. 260—6)

This invention relates to plastic molding material and method of making the same, and more particularly to the production of an inexpensive molding powder containing a relatively small percentage of synthetic resin and a relatively large percentage of extracted pine wood pitch, said synthetic resin and said extracted pine wood pitch being rendered compatible by the admixture of wheat flour thereto.

It is a principal object of the present invention to provide low-cost molding powders possessing good flowability in the mold, and containing minimum proportions of phenol- or urea-aldehydic resins; which molding powders are suitable for the production of molded articles characterized by low water absorption and adequate tensile strength and hardness. Other objects and advantages of the present invention will become apparent as this description proceeds.

Attempts hitherto have been made to combine phenol-aldehydic resins or the like with various resin substitutes. These mixtures frequently lacked compatibility, and this is particularly the case when the mixture contained only a relatively small proportion of phenol-aldehyde resin or the like. It is also well-known to dilute synthetic resins with various fillers. Such mixtures ordinarily are characterized by high water absorption, which renders the resultant product unsuitable for uses where it will be exposed to steam or moisture.

I have discovered that extracted pine wood pitch, wheat, and synthetic aldehydic resin may be combined to form a homogeneous plastic molding material suitable for the manufacture of molded articles having a water-absorption of less than two (2%) percent in combination with adequate tensile strength and hardness.

The extracted pine wood pitch is not compatible with the synthetic resin in the proportions which I have found desirable. If the liquid resin is first combined with wheat flour, however, and the extracted pine wood pitch subsequently introduced, a compatible mixture is obtained. While I do not care to be limited to any particular theory, I am of the opinion that the wheat cells are swollen but not ruptured in the course of the manufacture of my new improved molding powder, and that the presence in said molding powder of said swollen wheat cells imparts thereto maximum flowability within the mold under the conditions obtaining in commercial molding operations.

According to the present invention, wheat, preferably in the form of flour, and a liquid resin, such as an incompletely condensed phenol-formaldehyde resin, are worked together until a plastic mass is obtained. Extracted pine wood pitch is added thereto, preferably in combination with asbestos floats or a similar filler, plasticizer, and an alkali such as calcium oxide. The combined mass is kneaded until it is homogeneous, then reduced to powder form, and cured, thereby producing the molding material of the present invention.

The invention will be readily understood from the following example, which is recited purely for purposes of illustration. For the sake of completeness and clarity, this example and the illustrated modifications thereof are recited in detailed and specific form, but it is distinctly to be understood that I do not limit myself to the exact ingredients, proportions, and details of operation recited therein.

*Example*

| Ingredient | Weight | Per cent by weight on dry basis |
|---|---|---|
| | Pounds | |
| 75% solids content resin | 42 | 12.4 |
| Whole wheat flour | 80 | 34.0 |
| Extracted pine wood pitch | 22 | 10.7 |
| Asbestos floats | 78 | 34. |
| Calcium stearate | 3 | 1.27 |
| Quicklime | 7 | 2.9 |
| Nitrobenzene | 5 | 2.0 |
| Raw castor oil | 4 | 1.7 |
| Dyes | [1] 2 | Q. S. |
| Sodium bicarbonate | [1] 1½ | Q. S. |
| Total | 243½ | 98.97 |

[1] Or Q. S.

From the foregoing example, it is apparent that the resin and pitch together weigh about two-thirds as much as the wheat employed.

The resin above referred to, may be, for example, a clear, transparent colorless liquid synthesized in an alkaline medium and comprising incompletely condensed phenol-formaldehyde resin containing 75% of non-volatile matter. The reaction of said resin ordinarily is slightly acid and it ordinarily contains a slight excess of formaldehyde, due to the employment in the original condensation reaction of something more than one molecule of formaldehyde for each molecule of phenol used. The non-volatile matter consists essentially of resin polymer. The volatile residue consists of approximately 5% water and 20% of unreacted phenol and formaldehyde in approximately equimolecular proportions.

Instead of the above described phenol-formaldehyde resin, other water soluble phenol-aldehyde or urea-aldehyde synthetic resins may be employed.

Nor is the invention limited to whole wheat flour. Comminuted wheat grains, ordinary commercial flour, etc., may be used. Commercial grades of flour analyzing approximately protein 16%, carbohydrate 65%, fat 3%, and fiber 16% may be used.

The term "extracted pine wood pitch" is used herein to designate a residual resinous composition obtained in connection with the production of wood naval stores products and comprising oxidized resin acids, oxidized terpenes, polyphenols, polymerized terpenes, and frequently some ligneous matter. The following average analysis is typical of an extracted pine wood pitch which I have found suitable for the purposes of the present invention:

Melting point (drop method) _____°C__ 115
Acid number _____ 93
Gasoline soluble matter_____per cent__ 12
Toluene insoluble matter_____do____ 20

The asbestos floats do not merely act as a filler, but appear to improve the properties of the molding powder. Ligno-cellulose may be used instead, and imparts a certain amount of flow and bonding action to the finished molding powder.

Calcium stearate, castor oil and nitrobenzene merely exemplify the class of plasticizers which are suitable, and equivalent substances may be utilized. The quicklime acts as an activator and also reacts chemically with the extracted pine wood pitch, which is acid in reaction. Other alkalis or alkaline reacting materials may be employed, but calcium oxide is the preferred member of this class. Various pigments (such as manganese dioxide) may be used in place of, or in conjunction with, the dyes recited in the above example.

The proportions of the various ingredients may be varied somewhat, but the wheat content is generally less than 50% of the weight of the total composition, and the synthetic resin content never exceeds 50% of the wheat content. Enough wheat flour is used to combine with all the free formaldehyde in the resin.

Process

The whole wheat flour and the liquid resin are worked together at a temperature below 100° F. in suitable apparatus (such as a dough mixer) until a plastic mass is obtained. During this step, the wheat cells imbibe the unreacted formaldehyde and swell greatly. The individual cells, however, retain their identity and are not ruptured. These swollen wheat cells rather uniformly distributed throughout the final product impart thereto the property of ready flowability within the mold which is so essential to satisfactory commercial operation. In my opinion, optimum results are obtained when the flour absorbs a quantity of formaldehyde just insufficient to rupture the cell structure. Apparently, optimum imbibation occurs at a pH in the vicinity of 6.8.

The nitrobenzene, raw castor oil, and dyes are mixed together in a separate batch, and this mixture is gradually worked into the doughy mass of flour and synthetic resin. The pH of this combination is determined, and sodium bircarbonate or equivalent mild alkali is gradually introduced until the pH of the mass is between 6.4 and 7.0. The preferred pH is approximately 6.8.

The extracted pine wood pitch in pulverized form, asbestos floats, calcium stearate, and quicklime (calcium oxide) are mixed together dry at room temperature to constitute a third batch. This third batch is gradually worked into the previously combined batches, and the whole is mixed until a homogeneous product is obtained. I have found a mixer of the Banbury type well suited for this last mentioned operation. Thereafter the combined batch is kneaded further in a mixing device of the screw or roll type. The solid mass thus obtained is granulated in a hammer mill or the like.

The granulated powder is cured in an open kiln for approximately one hour at a temperature approximating 100° F. (38° C.), in order further to polymerize the resin ingredients, and to remove the undesirable volatile impurities. The resultant product is a molding powder suitable for use in any device adapted for the formation of molded articles of the thermosetting type by any hot-pressing procedure.

Heat and pressure molding of the above described powder produces a thermosetting infusible article of manufacture which conforms accurately to the contours of the dies. Such articles possess tensile strength and hardness within the range usually associated with plastics containing a large proportion of synthetic resin. In addition, the water absorption is low—less than 1.7% on submersion of a one-inch cube for 48 hours in water at 82° F.

Thus it will be seen that I have described a process whereby relatively large proportions of wheat and extracted pine wood pitch may be combined with relatively small proportions of synthetic resin to form new and improved molding powders characterized by satisfactory working properties and greatly reduced cost.

Although the invention has been described in connection with the details of specific examples thereof, it is not intended that such details shall be regarded as limitations upon the scope of the invention except insofar as included in the accompanying claims.

What I claim as new and desire to secure by Letters Patent is:

1. A thermosetting molding powder comprising the following ingredients in approximately the stated proportions by weight on a dry basis:

| | Per cent |
|---|---|
| Phenol-formaldehyde resin | 12.4 |
| Whole wheat flour | 34.0 |
| Extracted pine wood pitch melting at approximately 115° C. and having an acid number of about 93 | 10.7 |
| Asbestos floats | 34.0 |
| Calcium stearate | 1.3 |
| Calcium oxide | 2.9 |
| Nitrobenzene | 2.0 |
| Castor oil | 1.7 |
| Sodium bicarbonate | 0.2 |
| Dyes, q. s. | |

2. A molding compound comprising an intimate admixture of the following in approximately the stated proportions:

| | Percent by weight |
|---|---|
| Phenol-formaldehyde resin | 12 |
| Whole wheat flour | 34 |
| Extracted pine wood pitch melting at approximately 115° C. and having an acid number of about 93 | 10 |
| Filler | 34 |
| Plasticizer | 5 |

Alkali sufficient to adjust the pH between 6.4 and 7.0.

3. A molding compound comprising an intimate admixture of the following in approximately the stated proportions:

| | Parts by weight |
|---|---|
| Urea-formaldehyde resin | 12 |
| Whole wheat flour | 34 |
| Extracted pine wood pitch melting at approximately 115° C. and having an acid number of about 93 | 10 |
| Filler | 34 |
| Plasticizer | 5 |

Alkali sufficient to adjust the pH between 6.4 and 7.0.

4. A molding powder adapted to be formed into articles by heat and pressure and characterized by good flowing properties in the mold, comprising an intimate mixture of wheat flour, extracted pine wood pitch having an acid number of about 93 and melting at approximately 115° C., and synthetic resin selected from the class consisting of phenol-formaldehyde resins and urea-formaldehyde resins; said flour being less than half the weight of said molding powder, and the combined weight of said pitch and said resin being approximately two-thirds the weight of said flour.

5. A molding powder adapted to be formed into articles by heat and pressure and characterized by good flowing properties in the mold, comprising an intimate mixture of wheat flour, phenol-formaldehyde resin, and extracted pine wood pitch having an acid number of about 93 and melting at approximately 115° C.; said flour being less than half the weight of said molding powder, and the combined weight of said pitch and said resin being approximately two-thirds the weight of said flour.

6. A molding powder adapted to be formed into articles by heat and pressure and characterized by good flowing properties in the mold, comprising an intimate mixture of wheat flour, urea-formaldehyde resin, and extracted pine wood pitch having an acid number of about 93 and melting at approximately 115° C.; said flour being less than half the weight of said molding powder, and the combined weight of said pitch and said resin being approximately two-thirds the weight of said flour.

7. A molded article characterized by infusibility, insolubility, low water absorption, and adequate tensile strength, said article comprising the product of heat and pressure treatment of a molding powder comprising an intimate mixture of wheat flour, extracted pine wood pitch having an acid number of about 93 and melting at approximately 115° C., and synthetic resin selected from the class consisting of phenol-formaldehyde resins and urea-formaldehyde resins; said flour being less than half the weight of said molding powder, and the combined weight of said pitch and said resin being approximately two-thirds the weight of said flour.

8. A molded article characterized by infusibility, insolubility, low water absorption, and adequate tensile strength, said article comprising the product of heat and pressure treatment of a molding powder comprising an intimate mixture of wheat flour, phenol-formaldehyde resin, and extracted pine wood pitch having an acid number of about 93 and melting at approximately 115° C.; said flour being less than half the weight of said molding powder, and the combined weight of said pitch and said resin being approximately two-thirds the weight of said flour.

9. A molded article characterized by infusibility, insolubility, low water absorption, and adequate tensile strength, said article comprising the product of heat and pressure treatment of a molding powder comprising an intimate mixture of wheat flour, urea-formaldehyde resin, and extracted pine wood pitch having an acid number of about 93 and melting at approximately 115° C.; said flour being less than half the weight of said molding powder, and the combined weight of said pitch and said resin being approximately two-thirds the weight of said flour.

10. The method of making a thermosetting molding powder, which comprises the steps of combining liquid phenol-formaldehyde resin with whole wheat flour; separately mixing extracted pine wood pitch having an acid number of about 93 and melting at approximately 115° C. with filler, plasticizer, and alkali; the ingredients being selected in such proportions that said flour comprises less than half the weight of said molding powder, and the combined weight of said pitch and said resin is approximately two-thirds the weight of said flour; combining the pitch mixture with the flour-resin combination; curing the homogeneous plastic mass thereby obtained; and pulverizing the same.

11. The method of making a thermosetting molding material, which comprises the steps of combining wheat flour with synthetic resin selected from the class consisting of phenol-formaldehyde resins and urea-formaldehyde resins; adding thereto filler, alkaline-reacting material, and extracted pine wood pitch having an acid number of about 93 and melting at approximately 115° C.; the ingredients being selected in such proportions that said flour comprises less than half the weight of said molding material, and the combined weight of said resin and said pitch is approximately two-thirds the weight of said flour; and curing the plastic mass thereby obtained.

12. The method of making a thermosetting molding material, which comprises the steps of combining wheat flour with phenol-formaldehyde resin; adding thereto filler, alkaline-reacting material, and extracted pine wood pitch having an acid number of about 93 and melting at approximately 115° C.; the ingredients being selected in such proportions that said flour comprises less than half the weight of said molding material, and the combined weight of said resin and said pitch is approximately two-thirds the weight of said flour; and curing the plastic mass thereby obtained.

13. The method of making a thermosetting molding material, which comprises the steps of combining wheat flour with urea-formaldehyde resin; adding thereto filler, alkaline-reacting material, and extracted pine wood pitch having an acid number of about 93 and melting at approximately 115° C.; the ingredients being selected in such proportions that said flour comprises less than half the weight of said molding material, and the combined weight of said resin and said pitch is approximately two-thirds the weight of said flour; and curing the plastic mass thereby obtained.

14. Process for forming molded articles, including the steps of combining whole wheat flour with liquid phenol-formaldehyde resin; adding thereto filler, alkaline-reacting material, and extracted pine wood pitch having an acid number of about 93 and melting at approximately 115° C.; the ingredients being selected in such proportions that said flour comprises less than half the weight of the molded article, and the combined weight of said resin and said pitch is approximately two-thirds the weight of said flour; curing the combined homogeneous plastic mass thereby obtained, by maintaining the same at a temperature approximating 38° C. for about an hour; pulverizing the same; and converting to an infusible, insoluble state.

15. Process of making molding material, comprising the steps of swelling wheat cells in incompletely polymerized phenol-formaldehyde resin containing free formaldehyde, the amount of wheat being less than one-half the weight of said molding material but at least enough to combine with all of said free formaldehyde; mixing therewith an extracted pine wood pitch having an acid number of about 93 and melting at approximately 115° C. in such amount that the combined weight of said resin and said pitch is approximately two-thirds the weight of said wheat cells; and curing the combined mass.

16. In the production of molding powders, the steps of mixing comminuted wheat in amount not exceeding one-half the weight of said molding powder with an amount not exceeding one-half the weight of said wheat of incompletely condensed phenol-formaldehyde resin containing excess formaldehyde, thereby causing the cells of said comminuted wheat to imbibe formaldehyde and swell; and thereafter incorporating in said resin-wheat combination extracted pine wood pitch having an acid number of about 93 and melting at about 115° C., the quantity of said pitch being selected so that the combined weight of said resin and said pitch is approximately two-thirds the weight of said wheat.

17. The method of rendering resins selected from the class consisting of phenol-formaldehyde resins and urea-formaldehyde resins compatible with extracted pine wood pitch having an acid number of about 93 and a melting point of about 115° C., which comprises incorporating wheat flour therewith; the ingredients being selected in such proportions that said flour comprises not more than half the total weight, and the combined weight of said resin and said pitch is approximately two-thirds the weight of said flour.

18. A thermosetting molding powder comprising synthetic phenol-formaldehyde resin and pine wood pitch melting at approximately 115° C. and having an acid number of about 93, said resin and said pitch being rendered compatible by the admixture thereto of whole wheat flour; the ingredients being combined in such proportions that said flour comprises not more than half the weight of said powder, and the sum of said resin and said pitch is approximately two-thirds the weight of said flour.

19. A molding compound comprising a substantially uniform dispersion of wheat cells swollen with formaldehyde in an intimate admixture of extracted pine wood pitch and resin selected from the group consisting of phenol-formaldehyde resins and urea-formaldehyde resins; said pitch having an acid number of about 93 and a melting point of about 115° C.; the ingredients of said compound being combined in such proportions that said wheat cells comprise not more than half the weight thereof, and the sum of said pitch and said resin is about two-thirds the weight of said wheat cells.

CLETUS L. DIXON